United States Patent (10) Patent No.: US 8,294,083 B2
Nishioka et al. (45) Date of Patent: Oct. 23, 2012

(54) IMAGE DISPLAY DEVICE AND METHOD WITH MIRROR DRIVE SENSITIVITY CORRECTION

(75) Inventors: Ken Nishioka, Daito (JP); Atsuya Hirano, Daito (JP); Hiroki Matsubara, Daito (JP); Hiroshi Nishigaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 574 days.

(21) Appl. No.: 12/485,564

(22) Filed: Jun. 16, 2009

(65) Prior Publication Data

US 2010/0006740 A1 Jan. 14, 2010

(30) Foreign Application Priority Data

Jul. 10, 2008 (JP) ................................. 2008-180383

(51) Int. Cl.
*H01J 3/14* (2006.01)
(52) U.S. Cl. ......................... 250/234; 348/203; 348/205
(58) Field of Classification Search .................. 250/234; 348/203, 205
See application file for complete search history.

(56) References Cited

U.S. PATENT DOCUMENTS

| 4,791,591 | A | | 12/1988 | Asanuma et al. |
| 4,990,763 | A | | 2/1991 | Shinada |
| 5,105,296 | A | | 4/1992 | Cho et al. |
| 5,253,085 | A | * | 10/1993 | Maruo et al. .................. 358/481 |
| 2003/0015652 | A1 | | 1/2003 | Kandori et al. |
| 2007/0268358 | A1 | * | 11/2007 | Noguchi et al. ............. 347/261 |
| 2009/0141192 | A1 | * | 6/2009 | Nojima .......................... 348/745 |

FOREIGN PATENT DOCUMENTS

| JP | 6-342126 | 12/1994 |
| JP | 8-505717 | 6/1996 |
| JP | 11514781 | 12/1999 |
| JP | 2001-56444 | 2/2001 |
| JP | 2003131151 A | 5/2003 |
| JP | 2006-323035 | 11/2006 |
| WO | 2008032485 A1 | 3/2008 |

OTHER PUBLICATIONS

Patent Abstracts of Japan for Japanese Publication No. 2006-323035, Publication date Nov. 30, 2006 (1 page).
esp@cenet patent abstract for Japanese Publication No. 11514781, Publication date Dec. 14, 1999 (1 page).
Patent Abstracts of Japan for Japanese Publication No. 06-342126, Publication date Dec. 13, 1994 (1 page). PCT National Publication Gazette for International Publication No. WO95/15052, Publication date Jun. 1, 1995 (2 pages) (Corresponds to JP8-505717).
Patent Abstracts of Japan for Japanese Publication No. 2001-056444, Publication date Feb. 27, 2001 (1 page).
Extended European Search Report for patent application No. 09163962.5, dated Apr. 6, 2010, 5 pages.

* cited by examiner

*Primary Examiner* — Georgia Y Epps
*Assistant Examiner* — Kevin Wyatt
(74) *Attorney, Agent, or Firm* — Osha Liang LLP

(57) ABSTRACT

An image display device is provided, by which variations in drive sensitivity of a scan mirror is corrected. Processing executed by a CPU in a laser projector includes the steps of: driving a scanner mirror in a vertical direction; allowing at least one of a green laser and red/blue lasers to emit light; calculating stay time in a light-receiving region in a photoreceptor; comparing the calculated stay time with ideal stay time $T_{ideal}$; decreasing a tilt of a drive signal for driving the scanner mirror in the vertical direction if the calculated stay time is shorter than the stay time $T_{ideal}$; and increasing the tilt of the drive signal if the calculated stay time is longer than the stay time $T_{ideal}$.

16 Claims, 8 Drawing Sheets

IMAGE DISPLAY DEVICE AND METHOD WITH MIRROR DRIVE SENSITIVITY CORRECTION

BACKGROUND OF THE INVENTION

1. Field of the Invention

The present invention relates to a device and a method for displaying an image, and particularly relates to control of a scan mirror.

2. Description of the Background Art

As to an image display device, Japanese Patent Laying-Open No. 2006-323035, for example, discloses a technique for "controlling display of an image with higher precision and higher accuracy, and achieving a display device at a lower price" ("Problems to be Solved" in "Abstract").

Japanese Patent National Publication No. 11-514781 discloses an invention relating to "a scanning device having a scanning element and a control system for controlling a position of the scanning element, in which a non-scanning plane of the scanning element configures a measurement reference plane, the control system has a position detection system for detecting a position of the scanning element, and an output terminal of the position detection system is connected to a control circuit for correcting the position of the scanning element in a direction vertical to the reference plane" (the first paragraph on page 5 in the specification).

Japanese Patent Laying-Open No. 06-342126 discloses "a projection display device, more specifically, a projection display device in which an optical signal emitted from an optical shutter array having multiple optical shutter elements arranged in a one-dimensional manner, based on an image data, is scanned with a deflection mirror to project a two-dimensional image" (paragraph 0001).

Japanese Patent National Publication No. 08-505717 discloses an invention relating to "a method of compensating for a pyramidal error (Pyramidalfehlerausgleich) caused by an insufficient tilt of mirror surfaces of a rotary polygon mirror acted upon by a light beam and deflecting a bundle of rays, in which when the mirror surfaces have a tilt error, deflection correction (Korrekturablenkung) of the bundle of rays reflected from each of the mirror surfaces is conducted at a correction angle in a direction opposite to the direction of the deflection caused by the insufficient tilt", and an invention relating to "a device for implementing the above-described method, including: a rotary polygon mirror acted upon by a light beam so as to deflect a bundle of rays by means of its mirror surfaces; a deflector for conducting, when the mirror surfaces have an insufficient tilt, deflection correction of the bundle of rays at a correction angle in a direction opposite to the direction of the deflection caused by the insufficient tilt; and a control device for controlling the deflector so as to correct the deflection" (the first paragraph in the specification).

Japanese Patent Laying-Open No. 2001-056444 discloses an invention relating to "a laser display device for driving each of R, G, and B lasers based on a video signal, and scanning a laser beam of each of the lasers on a color monitor in a horizontal direction and a vertical direction by means of horizontally-scanning means and vertically-scanning means to display an image" (paragraph 0001).

In a beam-scanning display device such as a laser projector, drive sensitivity of a scan mirror may differ from ideal sensitivity predefined as design information, because of an individual difference in the scan mirror. Here, the drive sensitivity refers to a ratio of an output (e.g. a moving amount of the scan mirror, such as a scan angle) to an input (e.g. a voltage value) provided to a drive mechanism of the scan mirror. For example, in the case that the drive sensitivity of the scan mirror in a vertical direction is higher than ideal sensitivity, the scan mirror is moved in the vertical direction by an amount equal to or larger than a designed amount, in response to the same input, so that an interval between spots of a laser beam reflected by the scan mirror is increased. Consequently, conspicuous scan lines inevitably appear in a projected image.

On the other hand, in the case that the drive sensitivity is lower than ideal sensitivity, a moving amount of the scan mirror is smaller than a designed amount, so that an interval between spots of a laser beam reflected by the scan mirror is decreased, resulting in that an image is projected in an overlapping manner. Accordingly, there is a demand to achieve an ability to prevent deterioration in quality of the projected image.

SUMMARY OF THE INVENTION

In brief, according to an embodiment, a device for displaying an image is provided. The device includes: a light source for emitting light; a mirror for reflecting the light emitted by the light source; an actuator configured to drive the mirror in a predetermined direction; a photoreceptor configured to receive the light reflected from the mirror in a light-receiving region; and a controller configured to control drive of the mirror in the predetermined direction, based on light-receiving time from a start to an end of light reception in the light-receiving region.

According to another embodiment, a method of displaying an image is provided. The method includes the steps of: emitting light; reflecting the emitted light by a mirror; driving the mirror in a predetermined direction; receiving the light reflected from the mirror in a light-receiving region; and controlling drive of the mirror in the predetermined direction, based on light-receiving time from a start to an end of light reception in the light-receiving region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
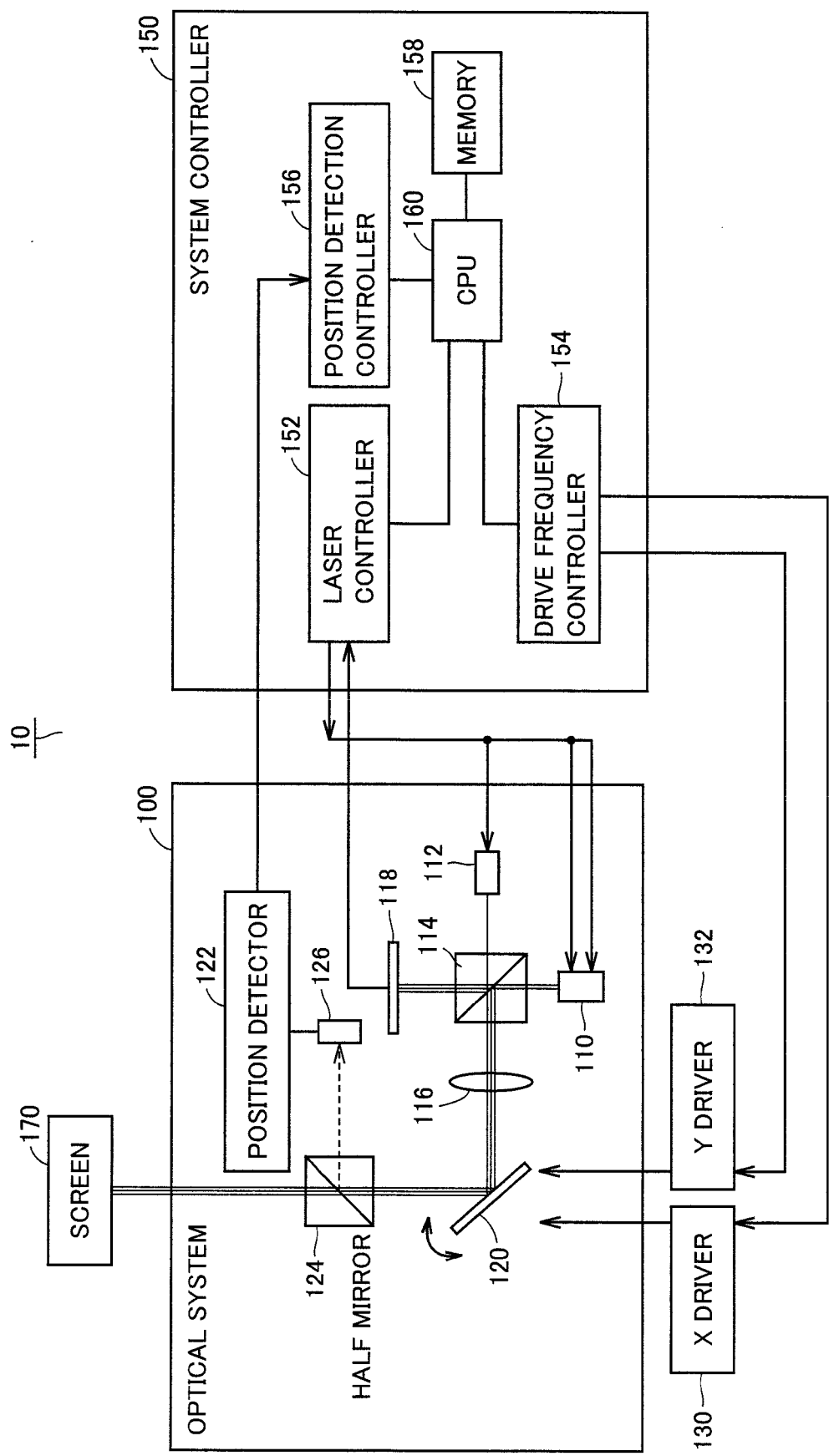
FIG. 1 is a block diagram that represents a hardware configuration of a laser projector 10 serving as a mode of an image display device according to an embodiment of the present invention.

An embodiment of the present invention will hereinafter be described with reference to the drawings. In the following description, the same parts are provided with the same reference characters, and have the same names and functions. Therefore, the detailed description thereof will not be repeated.

[Hardware Configuration]

With reference to FIG. 1, description will be made on an image display device according to an embodiment of the present invention. Laser projector 10 includes an optical system 100, a system controller 150, an X driver 130, and a Y driver 132.

Optical system 100 includes red/blue lasers 110, a green laser 112, a polarization beam splitter 114, a collimator lens 116, a scanner mirror 120, a half mirror 124, a photoreceptor 126, and a position detector 122. System controller 150 includes a laser controller 152, a drive frequency controller 154, a position detection controller 156, a memory 158, and a CPU (Central Processing Unit) 160. Laser projector 10 projects an image onto a screen 170 provided in front of optical system 100.

A red laser beam and a blue laser beam delivered by red/blue lasers 110 are reflected by polarization beam splitter 114, and the reflected lights are directed to collimator lens 116. A laser beam delivered by green laser 112 passes through polarization beam splitter 114 and is directed to collimator lens 116.

Scanner mirror 120 reflects the laser beams of respective colors, which have passed through collimator lens 116, toward a range predefined as a scan range. Scanner mirror 120 is driven by X driver 130 and Y driver 132 in a horizontal direction and a vertical direction, respectively.

Half mirror 124 allows a part of the laser beams reflected by scanner mirror 120 to pass therethrough, and reflects another part of the laser beams. The light reflected by half mirror 124 is received by photoreceptor 126. In contrast, the part of the laser beams that has passed through half mirror 124 is projected onto screen 170 via a lens (not shown).

Photoreceptor 126 is configured with, for example, a plurality of photodiodes. An output of photoreceptor 126 is inputted to position detector 122. Position detector 122 scans an output obtained from photoreceptor 126 in a horizontal direction and a vertical direction, and delivers data obtained through the scanning to system controller 150.

In system controller 150, CPU 160 is configured to control laser controller 152 and drive frequency controller 154 based on an output from position detection controller 156. Furthermore, CPU 160 stores in memory 158 positional information of scanner mirror 120, which has been calculated based on the output from position detection controller 156. The positional information includes, for example, a scan angle, a signal value outputted for providing the scan angle (e.g. a voltage value), and the like. Memory 158 is implemented as a non-volatile memory such as a flash memory in a certain aspect, or as a volatile memory in another aspect.

Laser controller 152 is configured to control red/blue lasers 110 and green laser 112 based on an output from CPU 160 and an output from a laser power detector 118. Further, laser controller 152 can deliver to CPU 160 an output obtained from laser power detector 118.

Drive frequency controller 154 is configured to control X driver 130 and Y driver 132 based on an output from CPU 160. More specifically, drive frequency controller 154 delivers to X driver 130 a signal having a frequency that defines drive in a horizontal direction such that scanner mirror 120 is driven in the horizontal direction (hereinafter also referred to as a "horizontal drive signal"), in response to a command from CPU 160. Furthermore, drive frequency controller 154 delivers to Y driver 132 a signal having a frequency that defines drive in a vertical direction such that scanner mirror 120 is driven in the vertical direction (hereinafter also referred to as a "vertical drive signal"), in response to a command from CPU 160. Based on the horizontal drive signal, X driver 130 drives scanner mirror 120 in the horizontal direction. Based on the vertical drive signal, Y driver 132 drives scanner mirror 120 in the vertical direction.

Based on an output from position detector 122, position detection controller 156 A/D (Analog to Digital)-converts positional information of scanner mirror 120 (scan range), which is defined by the output of photoreceptor 126, and delivers the converted digital data to CPU 160. Based on the digital data, CPU 160 detects the position of scanner mirror 120, and in accordance with the detection result, controls laser controller 152 or drive frequency controller 154.

A vertical drive frequency and a horizontal drive frequency are predefined based on the size of scanner mirror 120, the scanning direction, and drive characteristics of X driver 130 or Y driver 132. In a certain aspect, data that provides the vertical drive frequency and data that provides the horizontal drive frequency are stored in advance in memory 158.

In the present embodiment, a part or a whole of system controller 150 may also be implemented by a combination of hardware such as circuit elements. In another aspect, system controller 150 may also be implemented as a configuration that controls an operation of the hardware by software, by means of CPU 160 executing a program stored in memory 158.

[Correction to Tilt of Vertical Drive Waveform]

Figure 2:
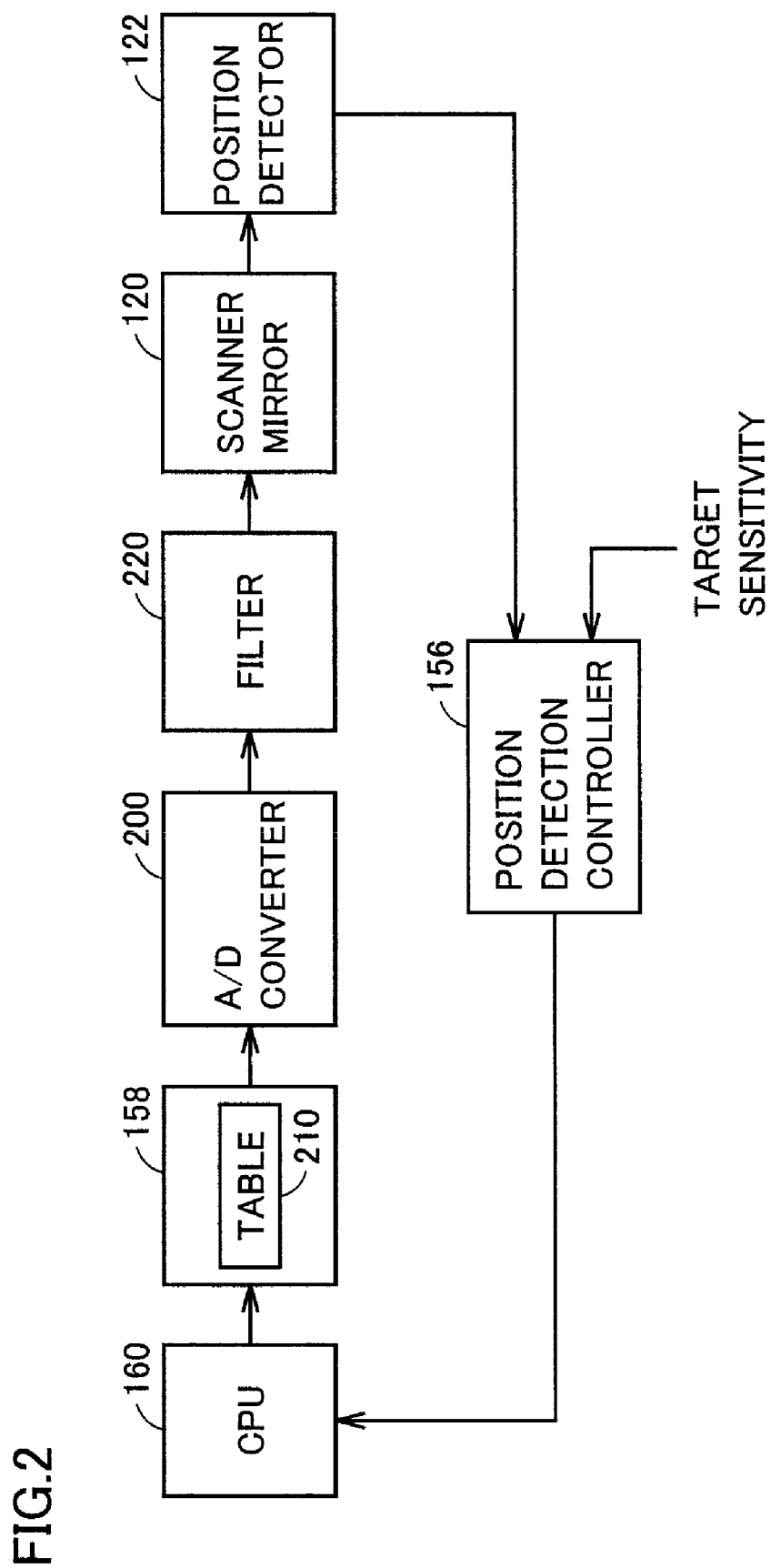
FIG. 2 is a diagram that schematically represents a configuration for allowing laser projector 10 to correct a drive waveform.

With reference to FIG. 2, description will be made on the correction to a drive waveform in laser projector 10 according to the embodiment. FIG. 2 is a diagram that schematically represents a configuration for achieving the correction to a drive waveform. Note that, although the example described below shows the case that scanner mirror 120 is driven in a vertical direction, application of the embodiment is not limited to the driving in a vertical direction. For example, in another aspect, the embodiment is also applicable to the case that scanner mirror 120 is driven in a horizontal direction, or the case that scanner mirror 120 is driven in a slanting direction.

CPU 160 refers to memory 158. Memory 158 stores a table 210. Table 210 includes data prepared in advance as design information on scanner mirror 120. The design information includes, for example, a drive signal to be outputted for driving scanner mirror 120 in a vertical direction, and stay time in a light-receiving region in photoreceptor 126 when scanner mirror 120 is normally driven in a vertical direction.

A value read out from memory 158 is inputted to an A/D converter 200, converted into digital data for control, and inputted to a filter 220. Filter 220 is implemented by, for example, CPU 160 applying a particular threshold value.

Filter 220 can be configured as a low-pass filter or a band-pass filter. An output of filter 220 (i.e. a tilt corrected as to a vertical drive waveform) is provided to scanner mirror 120.

Based on the corrected signal, scanner mirror 120 is driven in the vertical direction. The laser beam, which is identified as the light reflected from scanner mirror 120 and has been further reflected by half mirror 124, is received by photoreceptor 126, and its output is inputted to position detector 122. An output of position detector 122 is inputted to position detection controller 156. Position detection controller 156 further receives an input of target sensitivity relating to the drive of scanner mirror 120 in the vertical direction. Position detection controller 156 serves as a comparator and calculates a difference between the output from position detector 122 and the target sensitivity. Position detection controller 156 delivers the calculated difference to CPU 160 as an error signal.

Based on the error signal, CPU 160 derives a correction amount from table 210 in memory 158. For example, in a certain aspect, CPU 160 uses map data predefined in table 210, to thereby read out a coefficient corresponding to the difference specified by the error signal. CPU 160 multiplies the read-out coefficient by a tilt of an ideal drive signal to thereby calculate a tilt of the corrected drive signal. Alternatively, in another aspect, CPU 160 may also be configured to apply the relevant coefficient to a function specified in advance with use of an error signal to thereby calculate a tilt of the corrected drive signal as occasion demands.

In still another aspect, CPU 160 may also be configured to correct the drive signal by feedback control. For example, CPU 160 multiplies the error signal by a gain preset as design information to thereby calculate a coefficient. CPU 160 repeatedly conducts correction with use of the relevant gain until a value of the error signal from position detection controller 156 converges.

Alternatively, in another aspect, table 210 may also be configured to include a plurality of correction values prepared in advance. Each of the correction values is associated with each error signal that would possibly be outputted from position detection controller 156. CPU 160 may then specify a correction value associated with the relevant error signal from table 210, and correct the drive signal based on the correction value.

Figure 3:
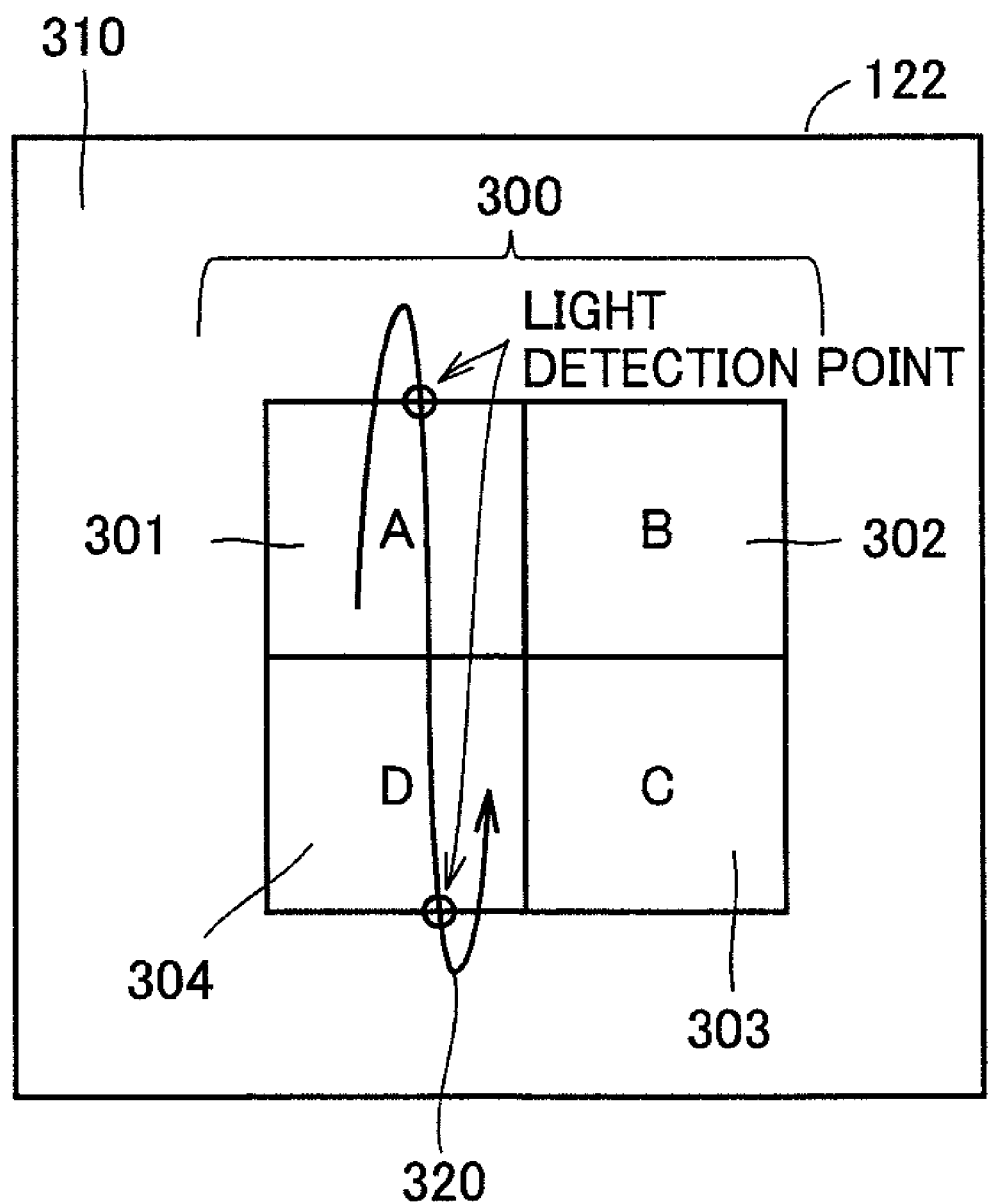
FIG. 3 is a diagram that schematically represents a configuration of a light-receiving region 300 in a photoreceptor 126 provided at laser projector 10.

With reference to FIG. 3, description will be made on photoreceptor 126 provided at laser projector 10 according to the present embodiment. FIG. 3 is a diagram that schematically represents a configuration of light-receiving region 300 in photoreceptor 126. Photoreceptor 126 includes a light-receiving region 300 for receiving a laser beam reflected by half mirror 124, and a peripheral region 310. Light-receiving region 300 includes a plurality of segmented light-receiving sections. More specifically, light-receiving region 300 includes light-receiving sections 301, 302, 303, 304. A boundary between light-receiving section 301 and light-receiving section 302 extends, for example, vertically, and a boundary between light-receiving section 301 and light-receiving section 304 extends, for example, horizontally.

If scanner mirror 120 is driven in a vertical direction, a path of scanner mirror 120 is represented by, for example, a path 320. A laser beam reflected by scanner mirror 120 is further reflected by half mirror 124, and the reflected light is received in light-receiving sections 301, 304, and then light-receiving sections 302, 303. When a laser beam is applied to peripheral region 310, a light-receiving level of photoreceptor 126 is 0 because peripheral region 310 is not defined as a region for an image to be projected onto screen 170.

It is noted that, although the projection in the vertical direction is shown as being conducted from top to bottom in the example shown in FIG. 3, a reverse pattern may also be adopted.

Figure 4:
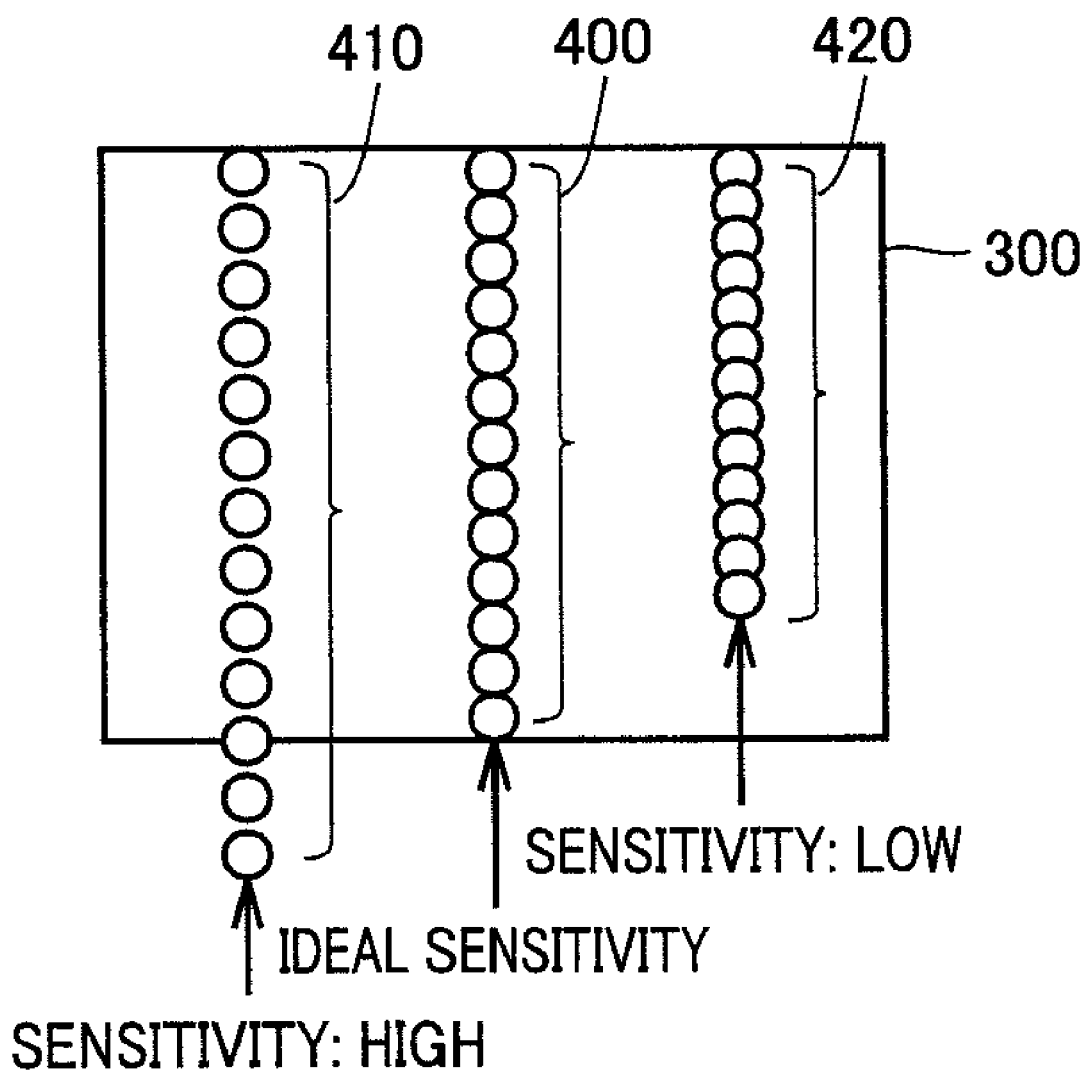
FIG. 4 is a diagram that represents a pattern of received light in the case that a scanner mirror 120 is driven in a vertical direction in an ideal manner, and a pattern of spots of a laser beam received in light-receiving region 300 in the case of high light-receiving sensitivity or low light-receiving sensitivity.

With reference to FIG. 4, description will be made on drive sensitivity of scanner mirror 120 in a vertical direction in laser projector 10 according to the present embodiment. FIG. 4 is a diagram that represents a pattern of received light in the case that scanner mirror 120 is driven in a vertical direction in an ideal manner, and a pattern of spots of the laser beam received in light-receiving region 300 in the case of high light-receiving sensitivity or low light-receiving sensitivity. More specifically, when scanner mirror 120 is driven in the vertical direction in a manner predefined as design information, a laser beam reflected by half mirror 124 is successively detected in a manner that allows spots of the laser beam to be adjacent to one another, as in a spot line 400.

In contrast, if sensitivity of the drive of scanner mirror 120 in the vertical direction is higher than the sensitivity of a predefined design level, a moving amount per time becomes large. Therefore, scanner mirror 120 moves in the vertical direction by an excessive amount with respect to a signal of the same value. In this case, as shown in a spot line 410, respective spots are not adjacent to one another, resulting in an interval therebetween. Consequently, the image projected in this case has pixels roughly arranged.

On the other hand, if sensitivity of the drive of scanner mirror 120 in the vertical direction is lower than the drive sensitivity predefined as a design matter, a moving amount per unit time becomes smaller than an ideal moving amount. Therefore, scanner mirror 120 is not driven as designed, even with a signal value outputted from Y driver 132. Accordingly, as shown in a spot line 420, respective spots based on the respective applied laser beams overlap, so that the pixels that configure the image are densely arranged. Consequently, the image projected onto screen 170 is displayed in an overlapping manner, resulting in image quality deterioration.

Figure 5:
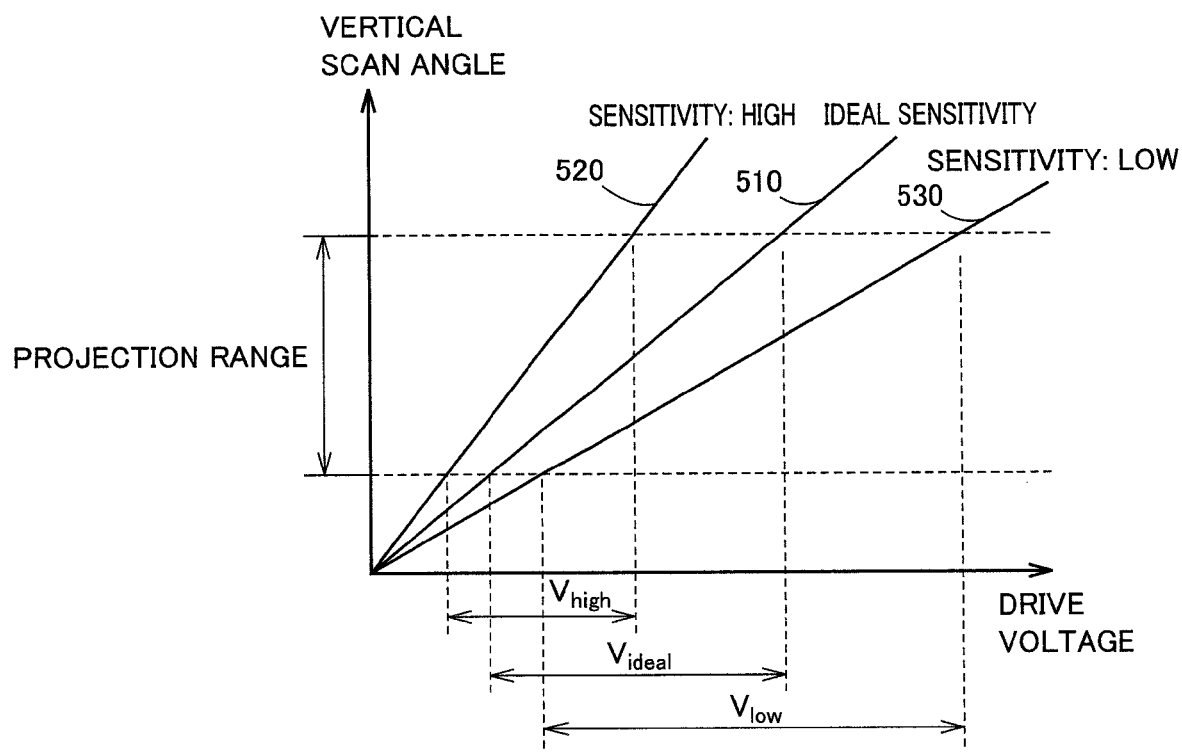
FIG. 5 is a diagram that represents the relation between a voltage value for driving scanner mirror 120 in laser projector 10 and a scan angle in a vertical direction.

With reference to FIG. 5, description will be made on drive characteristics of scanner mirror 120 in laser projector 10 according to the present embodiment. FIG. 5 is a diagram that represents the relation between a voltage value for driving scanner mirror 120 and a scan angle in a vertical direction. A graph 510 represents the relation between a drive voltage value and a scan angle in the case that scanner mirror 120 is driven in the vertical direction in accordance with a predefined design information. Sensitivity of the drive of scanner mirror 120 at this time can be said as ideal.

The drive voltage value at this time is represented as $V_{ideal}$. The drive voltage value corresponds to a voltage value for driving scanner mirror 120 such that a laser beam is reflected within a projection range (i.e. light-receiving region 300).

A graph 520 represents the case that drive sensitivity of scanner mirror 120 is higher than ideal sensitivity. In this case, a scan angle per voltage value becomes large, so that a magnitude of a voltage value $V_{high}$ provided to scanner mirror 120 for applying the laser beam within the same projection range becomes smaller than ideal voltage value $V_{ideal}$ ($V_{high} < V_{ideal}$).

A graph 530 represents the case that drive sensitivity of scanner mirror 120 in the vertical direction is lower than the ideal sensitivity defined as design information. In this case, a voltage value $V_{low}$ required for driving the same projection range becomes larger than ideal voltage value $V_{ideal}$ (voltage value $V_{ideal} < V_{low}$).

Accordingly, when it is sensed that drive sensitivity of scanner mirror 120 is high, CPU 160 executes correction processing for decreasing a tilt so as to coincide the tilt as in graph 520 with the tilt in graph 510. In other words, when CPU 160 provides a generally-used voltage value ($V_{ideal}$) to scanner mirror 120, scanner mirror 120 applies a laser beam to be projected beyond the projection range, and thus uses voltage value $V_{high}$ corresponding to the projection range for driving scanner mirror 120.

In contrast, when CPU 160 senses that drive sensitivity of scanner mirror 120 is lower than ideal sensitivity, it executes correction processing for allowing the tilt of graph 530 to coincide with the tilt of graph 510. Specifically, CPU 160 supplies voltage value $V_{low}$ for the same scan time, so as to allow the tilt to coincide with the tilt relating to ideal voltage value $V_{ideal}$. As a result, a voltage value to be provided to scanner mirror 120 is increased while the laser beam passes through light-receiving region 300. In the case of low sensitivity, an amount of change in voltage value per unit time becomes large thereby, so that a moving amount of scanner mirror 120 becomes large. As a result, scanner mirror 120 can conduct projection at an interval more standard than the interval of the pixels to be displayed with use of the original voltage value (i.e. in the state that overlapping is eliminated).

Figure 6:
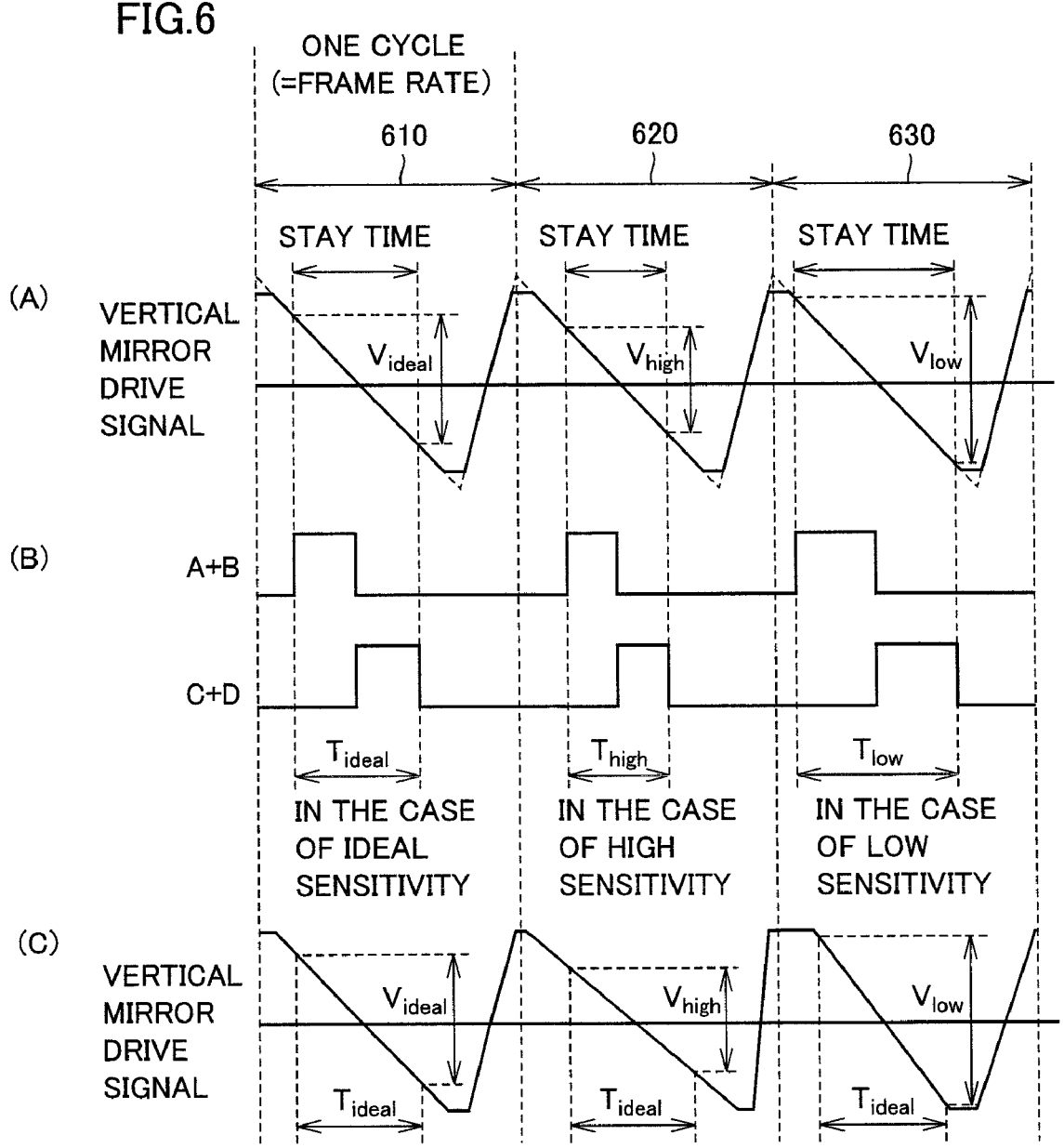
FIG. 6 is a diagram that represents changes in drive signal for scanner mirror 120 in laser projector 10 in every cycle, and changes in light-receiving level in photoreceptor 126.

With reference to FIG. 6, description will be made on changes in drive signal before and after the correction in laser projector 10 according to the present embodiment. FIG. 6 is a diagram that represents changes in drive signal in every cycle, and changes in light-receiving level in photoreceptor 126.

[In the Case of Ideal Drive Sensitivity]

A cycle 610 represents the case that drive sensitivity of scanner mirror 120 is ideal. Specifically, a laser beam reflected by scanner mirror 120 is received by photoreceptor 126 for stay time $T_{ideal}$, which represents ideal projection time specified based on the design information. At this time, the laser beam is received in region 300. During this period, an output from light-receiving region 300 in photoreceptor 126 is as shown in a chart (B). In other words, the reception in light-receiving sections 301, 302 is detected as an output ("A+B" in chart (B)), and then the reception in light-receiving sections 303, 304 is detected as an output ("C+D" in chart (B)). At this time, as shown in chart (C), voltage value $V_{ideal}$ is supplied for stay time $T_{ideal}$, for vertically driving scanner mirror 120.

[In the Case of Higher Drive Sensitivity]

A cycle 620 represents the case that drive sensitivity of scanner mirror 120 is higher than ideal sensitivity. It is noted that, although cycle 620 is shown after cycle 610 in chart (A) for ease of comparison, the cycle corresponding to the case of high drive sensitivity does not always appear after the cycle corresponding to the case of ideal drive sensitivity.

At this time, stay time $T_{high}$ required for applying a laser beam to light-receiving region 300 is detected by CPU 160 as time shorter than stay time $T_{ideal}$ in the case of ideal drive sensitivity.

To correct drive sensitivity, CPU 160 modifies the rate of change against time that defines a tilt of the drive signal, from ($V_{high}/T_{high}$) to ($V_{high}/T_{ideal}$). In this case, $T_{high}<T_{ideal}$, so that the modified rate of change ($V_{high}/T_{ideal}$) against time becomes smaller than the rate of change ($V_{high}/T_{high}$) against time prior to the modification. As a result, drive sensitivity is decreased, and an interval between spots of the laser beam becomes shorter.

It is noted that after the modification to the rate of change against time, CPU 160 calculates the stay time again based on an output from light-receiving region 300. If the stay time is shorter than ideal stay time $T_{ideal}$, CPU 160 determines that the drive sensitivity is still higher than the ideal sensitivity, and executes the above-described processing again to correct the tilt of the drive signal.

In contrast, if the stay time is longer than ideal stay time $T_{ideal}$, CPU 160 determines that the drive sensitivity is lower than the ideal sensitivity, and executes the processing described below for correcting a tilt of the drive signal in that case.

[In the Case of Low Drive Sensitivity]

A cycle 630 represents the case that the sensitivity of scanner mirror 120 is lower than the ideal sensitivity. It is noted that although cycle 630 is shown after cycle 620 in chart (A) for ease of comparison, cycle 630 corresponding to the case that the drive sensitivity is lower than the ideal sensitivity does not always appear after cycle 620 corresponding to the case that the drive sensitivity is higher than the ideal sensitivity.

In this case, CPU 160 determines that stay time $T_{low}$ required for applying a laser beam to light-receiving region 300 is longer than stay time $T_{ideal}$ in the case of ideal drive sensitivity.

To correct the drive sensitivity, CPU 160 then modifies a rate of change against time that defines the tilt of the drive signal from ($V_{low}/T_{low}$) to ($V_{low}/T_{ideal}$). In this case, $T_{ideal}<T_{low}$, and hence the modified rate of change ($V_{low}/T_{ideal}$) against time becomes larger than the rate of change ($V_{low}/T_{low}$) against time prior to the modification. As a result, a moving amount of scanner mirror 120 per unit time becomes larger than the previous moving amount, so that an interval between spots of the laser beam becomes longer.

It is noted that after the modification to the rate of change against time, CPU 160 calculates the stay time again based on an output from light-receiving region 300. If the stay time is longer than ideal stay time $T_{ideal}$, CPU 160 determines that the drive sensitivity is still lower than the ideal sensitivity, and repeats the above-described processing so as to correct the tilt of the drive signal.

In contrast, if the stay time is shorter than ideal stay time $T_{ideal}$, CPU 160 determines that the drive sensitivity is higher than the ideal sensitivity, and executes the processing as in [In the Case of Higher Drive Sensitivity] described above.

[Control Structure]

Figure 7:
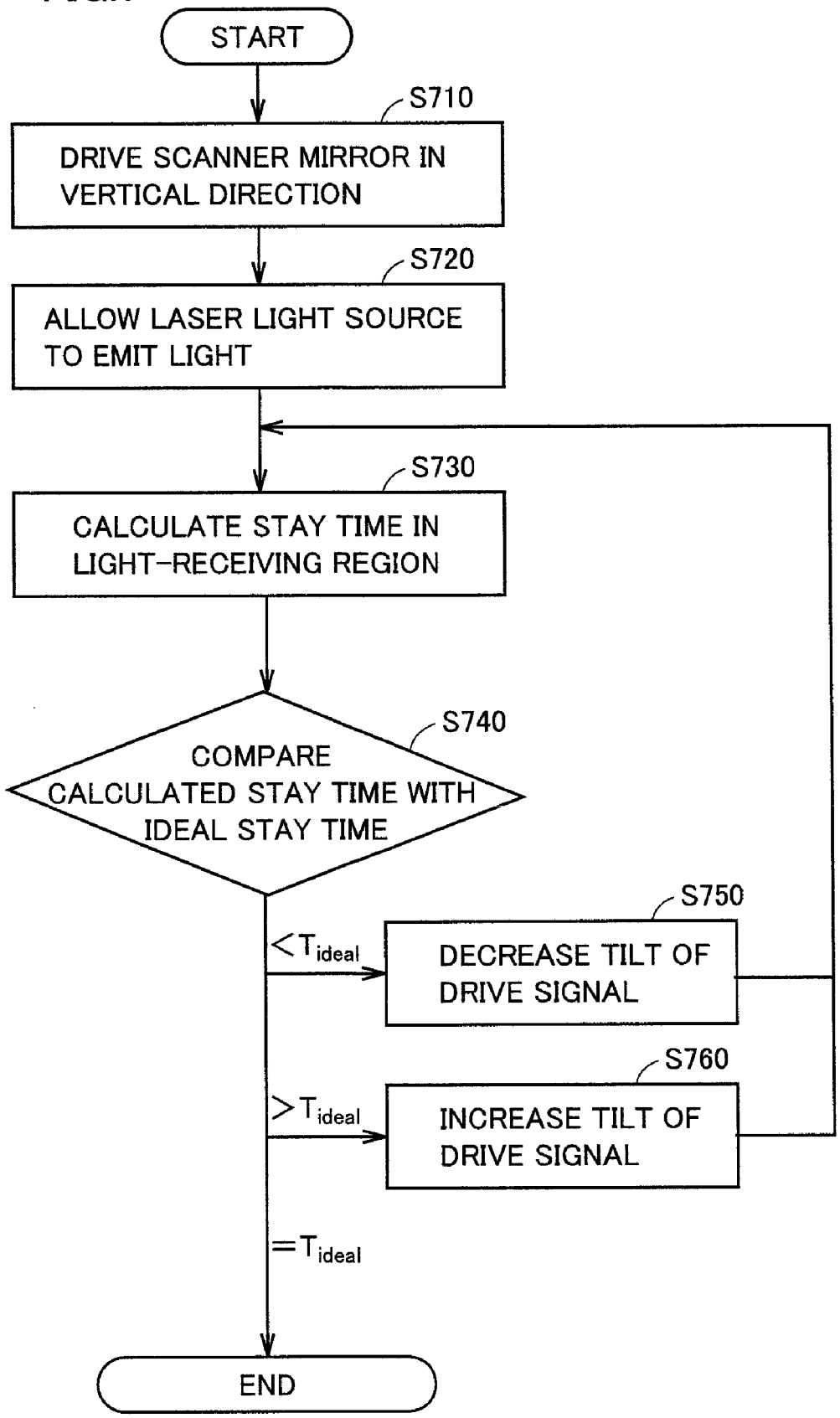
FIG. 7 is a flowchart that represents a part of a series of operations executed by a CPU 160 in laser projector 10.

With reference to FIG. 7, description will be made on a control structure of laser projector 10 according to the present embodiment. FIG. 7 is a flowchart that represents a part of a series of operations executed by CPU 160.

In step S710, CPU 160 drives scanner mirror 120 in a vertical direction by means of drive frequency controller 154 and Y driver 132.

In step S720, CPU 160 allows at least one of green laser 112 and red/blue lasers 110 to emit light, by controlling laser controller 152. A laser beam is reflected by scanner mirror 120, and the reflected light is further reflected by half mirror 124. The light reflected from half mirror 124 is received by photoreceptor 126. An output that corresponds to the reception in light-receiving region 300 in photoreceptor 126 is inputted to position detector 122. An output from position detector 122 is transmitted to system controller 150 and inputted to position detection controller 156.

In step S730, CPU 160 calculates the stay time in light-receiving region 300 in photoreceptor 126 (i.e. the time during which the laser beam is received in light-receiving region 300), based on the output from position detector 122.

In step S740, CPU 160 compares the calculated stay time with ideal stay time $T_{ideal}$, which is predefined as design information. If the detected stay time T is shorter than ideal stay time $T_{ideal}$, CPU 160 switches the control to step S750. If stay time T is longer than ideal stay time $T_{ideal}$, CPU 160 switches the control to step S760. If stay time T equals to ideal stay time $T_{ideal}$, CPU 160 terminates the processing for correction.

In step S750, CPU 160 decreases the tilt of a drive signal for driving scanner mirror 120 in a vertical direction (i.e. decreases the rate of change against time). The rate of change in the case of decreasing the tilt is, for example, calculated in accordance with the ratio of a difference between the calculated stay time T and ideal stay time $T_{ideal}$ to ideal stay time $T_{ideal}$. CPU 160 provides to drive frequency controller 154 an instruction to output the drive signal having its tilt modified. In accordance with the output from drive frequency controller 154, Y driver 132 drives scanner mirror 120 in the vertical direction based on the corrected drive signal. Subsequently, CPU 160 returns the control to step S730.

In step S760, CPU 160 increases the tilt of the drive signal. For example, CPU 160 calculates a difference between the calculated stay time T and ideal stay time $T_{ideal}$, and further calculates a ratio of the calculated difference to ideal stay time $T_{ideal}$. CPU 160 uses the ratio to thereby correct the tilt of the drive signal. CPU 160 provides the corrected drive signal, which has been calculated, to drive frequency controller 154. Drive frequency controller 154 causes Y driver 132 to drive scanner mirror 120 in a vertical direction. The drive sensitivity of scanner mirror 120 is thereby improved when compared with the case prior to the modification to the drive signal. Subsequently, CPU 160 returns the control to step S730.

The above-described operation is executed, for example, when a power source switch of laser projector 10 is set ON. It is thereby possible to implement the correction to the drive signal without the intention of a user, so that correction can easily be made. In another aspect, if laser projector 10 has a manipulation switch, the operation may be initiated based on the manipulation performed on the manipulation switch. It is thereby possible to adjust the image quality at a timing desired by the user of laser projector 10.

[Drive Signal]

Figure 8:
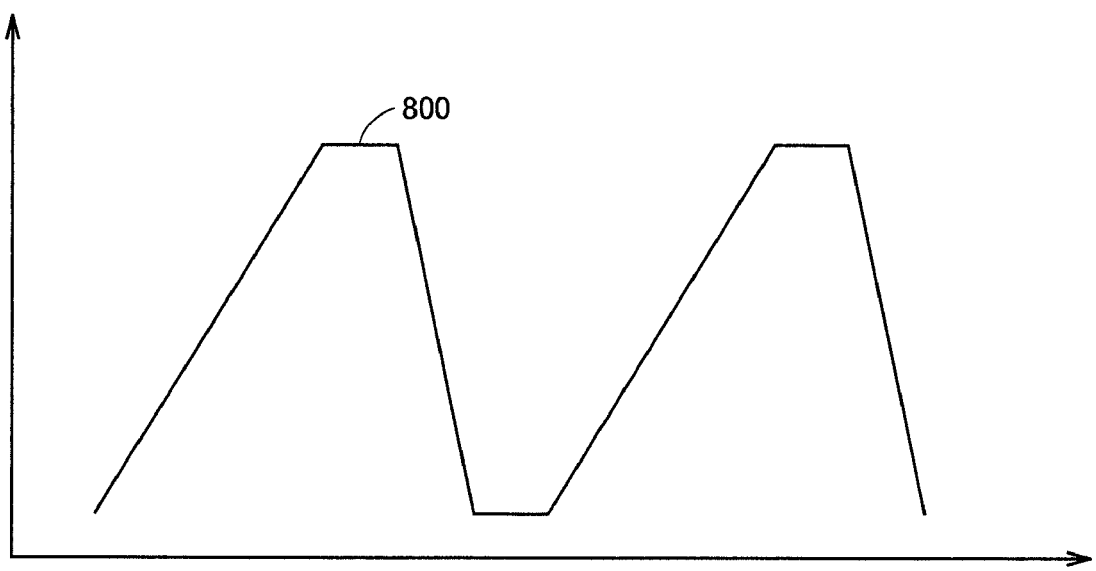
FIG. 8 is a diagram that represents a waveform of a drive signal 800 for driving scanner mirror 120 in a vertical direction.

With reference to FIG. 8, description will be made on the drive signal according to the present embodiment. FIG. 8 is a diagram that represents a waveform 800 of the drive signal for driving scanner mirror 120 in a vertical direction.

Waveform 800 of the drive signal does not have a shape of a triangular wave, but has such a shape that apexes of a triangle are scraped off in proximity to the maximum value and the minimum value. If the signal has an acute waveform in proximity to the maximum value and the minimum value, the signal includes a high-frequency component. As a result, scanner mirror 120 resonates and causes unevenness in an image to be projected onto screen 170. Therefore, to prevent the generation of such unevenness, a portion of drive signal 800 having the acute waveform is eliminated in proximity to the maximum value and the minimum value, so as to minimize a high-frequency component to be included in drive signal 800. For the same reason, filter 220 shown in FIG. 2 is inserted prior to the supply of an input to scanner mirror 120, so as not to allow a signal that would be a frequency component that could resonate scanner mirror 120 to pass through.

As described above, laser projector 10 according to the present embodiment detects the drive sensitivity of scanner mirror 120 in the vertical direction, and corrects the drive signal. Consequently, laser projector 10 can project an image without causing variations in density of the spots in the vertical direction, and thus it is possible to prevent degradation in quality of an image to be projected.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A device for displaying an image, comprising:
a light source for emitting light;
a mirror for reflecting the light emitted by said light source;
an actuator configured to drive said mirror in a predetermined direction;
a photoreceptor configured to receive the light reflected from said mirror in a light-receiving region; and
a controller configured to detect light-receiving time from a start to an end of light reception in the light-receiving region and control drive of said mirror in said predetermined direction based on the detected light-receiving time,
wherein the controller is configured to drive the mirror at a movement speed lower than a predetermined movement speed if the detected light-receiving time is shorter than a predefined time.

2. The device according to claim 1, wherein said controller is configured to set a rate of change against time of a signal for driving said mirror in said predetermined direction to be lower than a predetermined rate of change against time.

3. The device according to claim 1, wherein the controller is configured to drive the mirror at a movement speed higher than the predetermined movement speed if the detected light-receiving time is longer than the predefined time.

4. The device according to claim 3, wherein said controller is configured to set the rate of change against time of the signal for driving said mirror in said predetermined direction to be higher than the predetermined rate of change against time.

5. The device according to claim 1, wherein said light-receiving time includes time during which the light reception in said light-receiving region continues.

6. The device according to claim 1, wherein said controller is configured to allow said light source to emit light, while allowing said mirror to be driven in said predetermined direction.

7. The device according to claim 1, wherein said controller is configured to control the drive of said mirror in said predetermined direction when said device is started up.

8. The device according to claim 1, wherein said predetermined direction includes any of a horizontal direction and a vertical direction.

9. A method of displaying an image, comprising:
emitting light;
reflecting the emitted light by a mirror;
driving said mirror in a predetermined direction;
receiving the light reflected from said mirror in a light-receiving region;
detecting light-receiving time from a start to an end of light reception in the light-receiving region; and
controlling drive of said mirror in said predetermined direction based on the detected light-receiving time,
wherein the controlling includes driving the mirror at a movement speed lower than a predetermined movement speed if the detected light-receiving time is shorter than predefined time.

10. The method according to claim 9, wherein the controlling includes setting a rate of change against time of a signal for driving said mirror in said predetermined direction to be lower than a predetermined rate of change against time.

11. The method according to claim 9, wherein the controlling includes driving the mirror at a movement speed higher than the predetermined movement speed if the detected light-receiving time is longer than predefined time.

12. The method according to claim 11, wherein the controlling includes setting a rate of change against time of a signal for driving said mirror in said predetermined direction to be higher than a predetermined rate of change against time.

13. The method according to claim 9, wherein said light-receiving time includes time during which the light reception in said light-receiving region continues.

14. The method according to claim 9, wherein the controlling includes allowing said light source to emit light, while allowing said mirror to be driven in said predetermined direction.

15. The method according to claim 9, wherein the controlling includes controlling the drive of said mirror in said predetermined direction when said image display device is started up.

16. The method according to claim 9, wherein said predetermined direction includes any of a horizontal direction and a vertical direction.

* * * * *